(12) United States Patent
Kushida et al.

(10) Patent No.: US 7,992,455 B2
(45) Date of Patent: Aug. 9, 2011

(54) TIGHTENING TORQUE MEASURING UNIT

(75) Inventors: Toshihiko Kushida, Osaka (JP); Tatsuo Hirai, Otsu (JP)

(73) Assignee: Maeda Metal Industries, Ltd., Osaka (JP)

( * ) Notice: Subject to any disclaimer, the term of this patent is extended or adjusted under 35 U.S.C. 154(b) by 194 days.

(21) Appl. No.: 12/480,148

(22) Filed: Jun. 8, 2009

(65) Prior Publication Data
US 2009/0308178 A1 Dec. 17, 2009

(30) Foreign Application Priority Data
Jun. 12, 2008 (JP) .................................. 2008-153886

(51) Int. Cl.
*G01L 3/02* (2006.01)
(52) U.S. Cl. ..................................... 73/862.23
(58) Field of Classification Search ... 73/862.21–862.23
See application file for complete search history.

(56) References Cited

U.S. PATENT DOCUMENTS

| | | | | |
|---|---|---|---|---|
| 3,995,477 A | * | 12/1976 | Almond | 73/862.23 |
| 4,643,030 A | * | 2/1987 | Becker et al. | 73/862.23 |
| 4,959,797 A | * | 9/1990 | McIntosh | 700/275 |
| 5,589,644 A | | 12/1996 | Becker et al. | |
| 6,070,506 A | * | 6/2000 | Becker | 81/479 |
| 2005/0183513 A1 | | 8/2005 | Hsien | |

FOREIGN PATENT DOCUMENTS

| | | |
|---|---|---|
| EP | 0 100 023 A2 | 2/1984 |
| JP | 2007-111797 | 5/2007 |
| WO | 00/05037 A1 | 2/2000 |

* cited by examiner

*Primary Examiner* — Max Noori
(74) *Attorney, Agent, or Firm* — Eckert Seamans Cherim & Mellot, LLC; Kirk D. Houser, Esquire

(57) ABSTRACT

A tightening torque measuring unit capable of reducing errors with respect to either a clockwise or counterclockwise direction as soon as possible is provided. A tightening torque measuring unit 10, installed in a tightening device, includes a torque sensor 12 that detects a tightening torque and an amplifier that amplifies an output from the torque sensor 12. The amplifier 40 or 42 applies a different gain to the output from the torque sensor depending on whether the tightening direction of the tightening apparatus is clockwise or counterclockwise.

5 Claims, 6 Drawing Sheets

F I G. 3
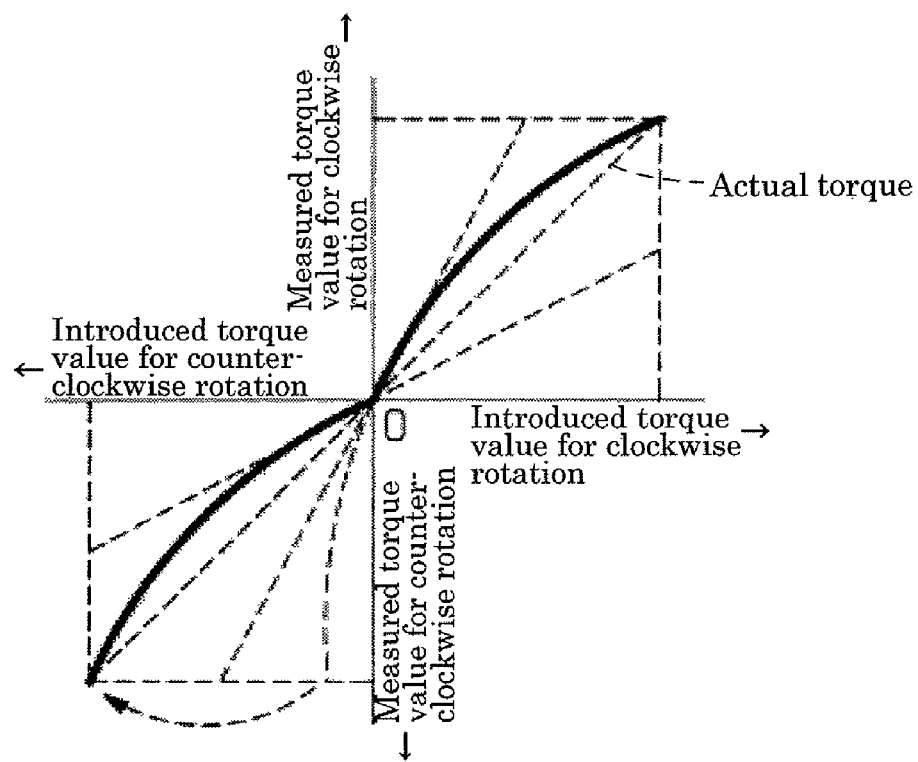

TIGHTENING TORQUE MEASURING UNIT

This application claims priority from Japanese Patent Application No. 2008-153886, filed Jun. 12, 2008, which is hereby incorporated by reference herein.

TECHNICAL FIELD

The present invention relates to a tightening torque measuring unit capable of detecting a tightening torque of a tightening member such as a bolt or a nut and, more specifically, relates to a tightening torque detection unit capable of measuring a tightening torque in either a clockwise or counterclockwise direction with high precision.

BACKGROUND OF THE INVENTION

A tightening torque detection unit capable of detecting a tightening torque when tightening a tightening member such as a bolt or a nut has been proposed. The tightening torque detection unit is used either installed in a tightening apparatus or removably installed in a power transmission mechanism of a tightening apparatus.

Such a tightening torque measuring unit comprises, as shown in FIG. 5, a torque sensor 12 such as a strain gauge, an amplifier 14 connected to the torque sensor 12, an A/D converter 16, a microprocessor (or MPU) 20, a display means 30 that displays a measured output torque value, and as necessary a storage means 32 that stores the measured torque value.

The amplifier 14 either amplifies a torque output received from the torque sensor 12 with an adjusted gain 15 or corrects the torque output with an offset 16a, and then transmits the amplified or corrected torque output to the A/D converter 16, in which the torque output is then converted from analog to digital and transmitted to the microprocessor 20.

The microprocessor 20 includes a torque conversion means 28a that converts a digital signal input from the A/D converter 16 into a torque value, and a peak torque detection means 26 that detects a peak torque value. The peak torque detection means 26 detects a peak torque value with a converted value obtained by the torque conversion means 28a so as to display the peak torque value on the display means 30 or store it in the storage means 32. See, for example, JP 2007-111797A.

Conventionally, the output from the torque sensor 12 has been amplified with a constant gain, irrespective of the tightening direction of the tightening apparatus. The amplification should ideally be performed so as to provide a direct proportional relationship between the output (mV) from the torque sensor 12 and the measured torque value (Nm). However, if the amplification is performed with a constant gain irrespective of the tightening direction of the tightening apparatus, the measured output torque value in either a clockwise or counterclockwise tightening direction tends to deviate from the actual value as the output (mV) of the torque sensor 12 increases, due to the characteristics of the torque sensor 12, the circularity of a portion on which the torque sensor 12 has been installed (e.g., the circularity of a shaft or a cylindrical body on which the torque sensor has been installed), or the like.

Thus, in order to improve the accuracy of the measured torque value in either one of the rotational directions, as shown in FIG. 6, such amplification has been performed so as to reduce an error between the introduced torque value (or actually applied torque value) and the measured torque value in either one of the rotational directions (the clockwise direction in FIG. 6).

The problem in this case is that, as to the other rotational torque (the counterclockwise direction in FIG. 6), an error between the measured value and the actual value will increase as the torque value increases.

An object of the present invention is to provide a tightening torque measuring unit capable of reducing an error as soon as possible in either a clockwise or counterclockwise tightening direction.

SUMMARY OF THE INVENTION

To solve the above-described problem, the present invention provides a tightening torque measuring unit installed in a tightening apparatus. The tightening torque measuring unit comprises a torque sensor that detects a tightening torque and an amplifier that amplifies an output from the torque sensor, wherein the amplifier applies a different gain to an output from the torque sensor depending on whether the tightening direction of the tightening apparatus is clockwise or counterclockwise.

The amplifier may include a clockwise amplifier having a gain that is applied to a clockwise tightening torque and a counterclockwise amplifier having a gain that is applied to a counterclockwise tightening torque.

The tightening torque measuring unit of the present invention may be removably installed in an actuator or power transmission mechanism (e.g., a rotary shaft) of the tightening apparatus, or may be installed integrally with the tightening apparatus by being built in the actuator of the tightening apparatus.

Examples of such a tightening apparatus that can be equipped with the tightening torque measuring unit of the present invention include, for example, a motorized type, a compressed-air actuated type, a hydraulic actuated type, and a manual wrench.

According to the tightening torque measuring unit of the present invention, the amplifier applies a different gain to the torque output from the torque sensor depending on the tightening direction. This enables the value output from the torque sensor to get closer to the actual torque value, thereby implementing high-precision torque measurement.

The amplifier may be configured to apply a different gain to the output from the torque sensor, or may be configured to have a clockwise amplifier and a counterclockwise amplifier, both having different gains, arranged in parallel to each other and to perform amplification with a gain applied from either the clockwise amplifier in the case of a clockwise rotation or the counterclockwise amplifier in the case of a counterclockwise rotation.

BRIEF DESCRIPTION OF THE DRAWINGS

FIG. 3 is a schematic diagram showing the relationship between introduced torque values and measured torque values obtained by the application of individual clockwise and counterclockwise amplifiers of the tightening torque measuring unit according to the present invention.

DETAILED DESCRIPTION OF PREFERRED EMBODIMENTS

A tightening torque measuring unit 10 of the present invention is configured to, when tightening a bolt, a nut, or the like with a tightening apparatus (not shown), vary a gain applied to the output of a torque sensor 12 depending on whether the tightening direction is forward or backward, i.e., clockwise or counterclockwise.

Hereinafter, the present invention will be described with reference to the drawings.

Figure 1:
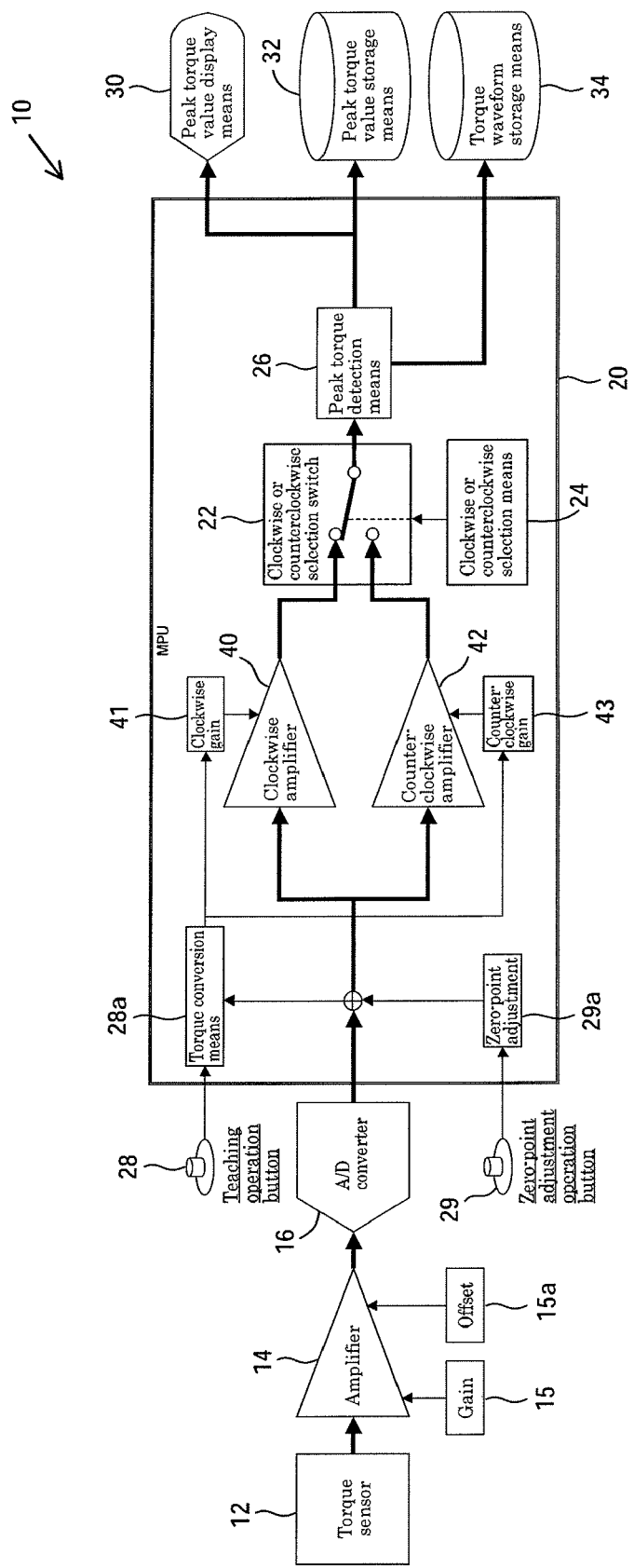
FIG. 1 is a block diagram of a tightening torque measuring unit of the present invention.
Figure 2:
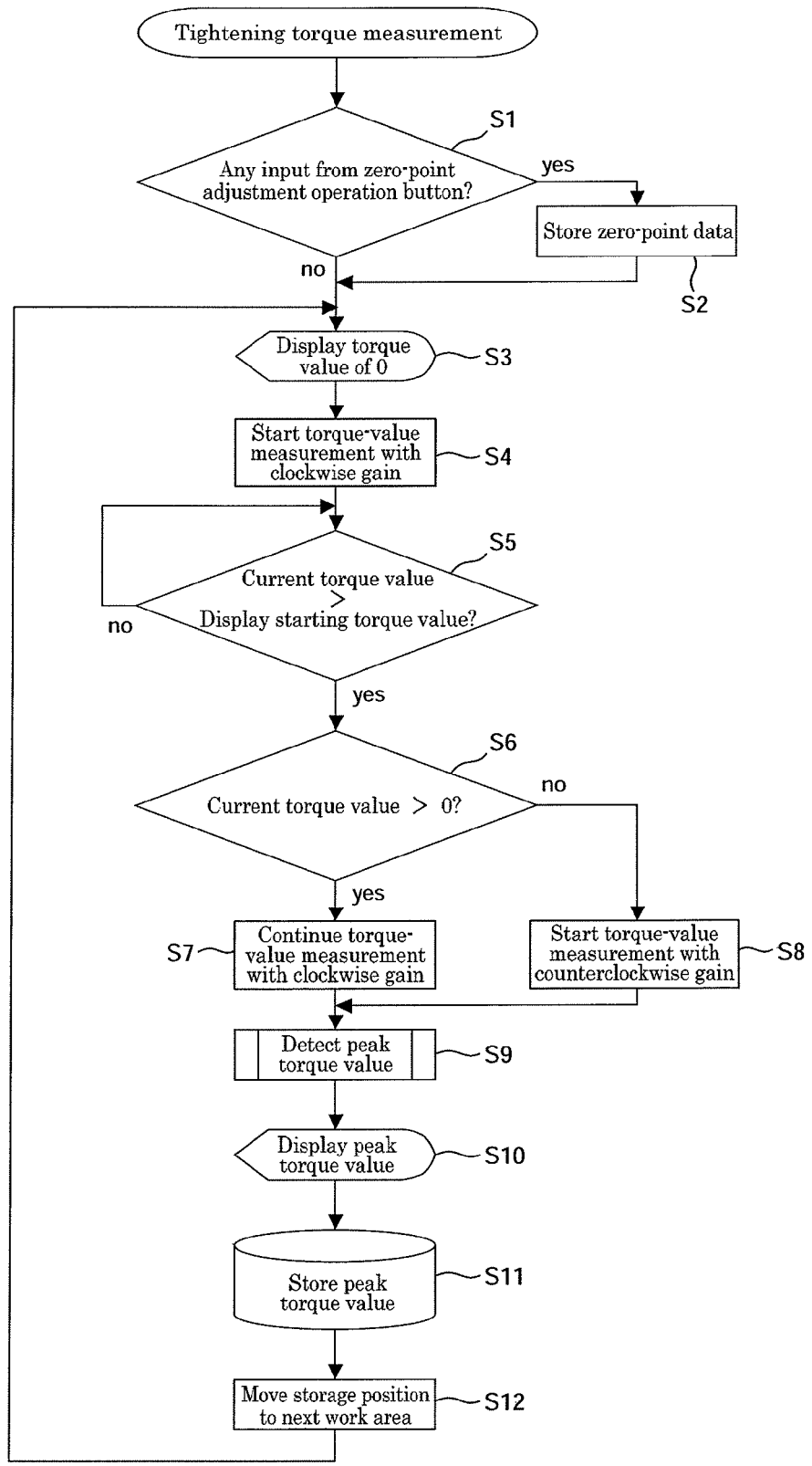
FIG. 2 is a flow chart diagram illustrating the steps performed by the tightening torque measuring unit of the present invention.

FIG. 1 is a block diagram of the tightening torque measuring unit 10 of the present invention. FIG. 2 is a flow chart diagram illustrating the steps performed by the tightening torque measuring unit 10.

As shown in FIG. 1, the tightening torque measuring unit 10 may include the torque sensor 12, an amplifier 14 that either amplifies an output from the torque sensor 12 with a gain 15 or corrects the output with an offset 16*a*, an A/D converter 16 that converts the output from the amplifier 14 from analog to digital, a microprocessor (or MPU) 20 which will be described later, a display means 30 that displays a torque value output from the microprocessor 20, and a storage means 32 that stores the torque value output from the microprocessor 20.

The torque measuring unit 10 is actuated upon the reception of power supplied from a battery or the like not shown.

The torque sensor 12 can be illustrated as a strain gauge. The torque sensor 12 may be installed in an actuator or power transmission mechanism, e.g., a rotary shaft, of a tightening apparatus when the tightening apparatus is of any one of a motorized type, a compressed-air actuated type, and a hydraulic actuated type; and it may be installed in an arm portion, a shaft portion, a socket, or the like of a tightening apparatus when the tightening apparatus is a manual wrench or a driver.

The microprocessor 20 includes an amplifier that amplifies a digital signal converted by the A/D converter 16. The amplifier may include a clockwise amplifier 40 and a counterclockwise amplifier 42, both applying different gains depending on the tightening direction of the tightening apparatus, and those amplifiers are connected in parallel to the output of the A/D converter 16. As shown in FIG. 1, the clockwise amplifier 40 controls an input digital signal with a clockwise gain 41, and the counterclockwise amplifier 42 controls an input digital signal with a counterclockwise gain 43 that has a different value from the clockwise gain 41.

It is preferable that a zero-point adjustment operation button 29 for use in performing a zero-point adjustment 29*a* be provided on the input side of the clockwise amplifier 40 and the counterclockwise amplifier 42 as shown in FIG. 1. By performing a zero-point adjustment 29*a* by operating the zero-point adjustment operation button 29 (step S1 in FIG. 2), a zero-point shift caused by the drift of the torque sensor 12 or the amplifier 14 due to temperature, moisture, or the like can be reset (step S2) and the torque value displayed on the display means 30 can be set to zero, with no-load conditions prior to measurement being recognized as zero (step S3).

It is preferable that the clockwise gain 41 of the clockwise amplifier 40 and the counterclockwise gain 43 of the counterclockwise amplifier 42 be readily controlled by a teaching operation before shipment or during maintenance. This enables the clockwise gain 41 and the counterclockwise gain 43 to be stored for example such that, as shown in FIG. 1, if a teaching operation button 28 is operated when a digital signal input into either the clockwise amplifier 40 or the counterclockwise amplifier 42 has been output from the A/D converter 16, a specific torque load is obtained by conversion and displayed as the measured value.

Specifically, the clockwise gain 41 is controlled in such a manner that a clockwise rated torque (for example, a torque of +800 Nm for a rated torque of 800 Nm) is applied to the tightening apparatus with the tightening torque measuring unit 10 installed therein, in which condition the teaching operation button 28 is operated to cause the torque conversion means 28*a* connected to the teaching operation button 28 to convert a measured clockwise torque value of the tightening torque measuring unit 10 to the clockwise rated torque (in the present example, +800 Nm). Similarly for the reverse rotation, the counterclockwise gain 43 is controlled in such a manner that a counterclockwise rated torque is applied, in which condition the teaching operation button 28 is operated to cause the measured counterclockwise torque value of the tightening torque measuring unit 10 to be converted to the counterclockwise rated torque (in the present example, −800 Nm). This eliminates the need for precise adjustment of the torque display to the rated torque applied to the tightening torque measuring unit 10, thereby enabling easy gain control before shipment or during maintenance.

The clockwise amplifier 40 and the counterclockwise amplifier 42 are connected to a switching mechanism 22 on the output side. The switching mechanism 22 determines whether the tightening direction of the tightening apparatus is clockwise or counterclockwise with a clockwise or counterclockwise selection means 24, which will be described later. If the tightening direction is clockwise, the switching mechanism 22 is connected to the clockwise amplifier 40, and if counterclockwise, the switching mechanism 22 is connected to the counterclockwise amplifier 42.

Assuming, for example, that the switching mechanism 22 has previously been connected to the clockwise amplifier 40 (step S4) and when the output from the clockwise amplifier 40 has become a predetermined value or more, e.g., when the output has become a preset display start torque value or more that is displayed at the start on the display means 30 (step S5), if the converted torque value (Nm) of the output (digital value) is positive, the clockwise or counterclockwise selection means 24 determines that the tightening direction of the tightening apparatus is clockwise; and if negative, the clockwise or counterclockwise selection means 24 determines that the tightening direction of the tightening apparatus is counterclockwise (step S6). If the determination result is clockwise, the switching mechanism 22 is kept connected to the clockwise amplifier 40 (step S7); while on the other hand, if the determination result is counterclockwise, the connection is switched to the counterclockwise amplifier 42 (step S8).

The output from either the clockwise amplifier 40 or the counterclockwise amplifier 42 is transmitted to a torque detection means 26 through the switching mechanism 22. The torque detection means 26 is a means for, for example, displaying on the display means 30 and/or storing in the storage means 32 a torque value to which the amplifier 40 or 42 has applied its gain.

In the example of the embodiment shown, the torque detection means 26 is illustrated as a means for detecting a peak torque value and transmitting the peak torque value to the display means 30 and/or the storage means 32.

Every time an input torque value updates the peak torque value (step S9), the peak torque detection means 26 displays the peak torque value on the display means 30 (step S10) or stores the peak torque value in the storage means 32 (step S11). For example, the storage of the peak torque value may be performed for each job. This allows a user to easily check current tightening conditions or a post process after tightening, and the like.

Note that the output from the torque detection means 26 is not limited to the peak torque value; the configuration may be such that the output from the amplifier 40 or 42 may be directly transmitted to the display means 30 and the storage means 32, and the display means 30 and the storage means 32 may respectively display and store a torque waveform or a torque value. Alternatively, a torque waveform storage means 34 that stores a torque waveform may be separately provided as shown in FIG. 1. Also, the display means 30 and the storage means 32 may be configured to respectively display and store information indicating that the torque value has reached its peak. It is also possible to output a torque value or information indicating that the value has reached the peak torque value in the form of a sound.

Moreover, the configuration may also be such that only either one of the display means 30 and the storage means 32 is provided, or such that the torque value output from the microprocessor 20 is output to an external display and/or storage means, instead of or in addition to the display means 30 and the storage means 32.

If no torque value has been input into the peak torque detection means 26 or the like for a predetermined period of time, or if no update has been made to the peak torque value for a predetermined period of time, a single tightening operation is considered to have been completed. In such a case, for example if any peak value has been stored and the next torque value is then input, it is treated as another job and another peak torque value will be stored in the storage means 32 (step S12).

The tightening torque measuring unit 10 of the present invention enables the application of different gains depending on the tightening direction of the tightening apparatus, and is thus capable of, for example, displaying a high-precision tightening torque in either a clockwise or counterclockwise tightening direction.

Figure 6:
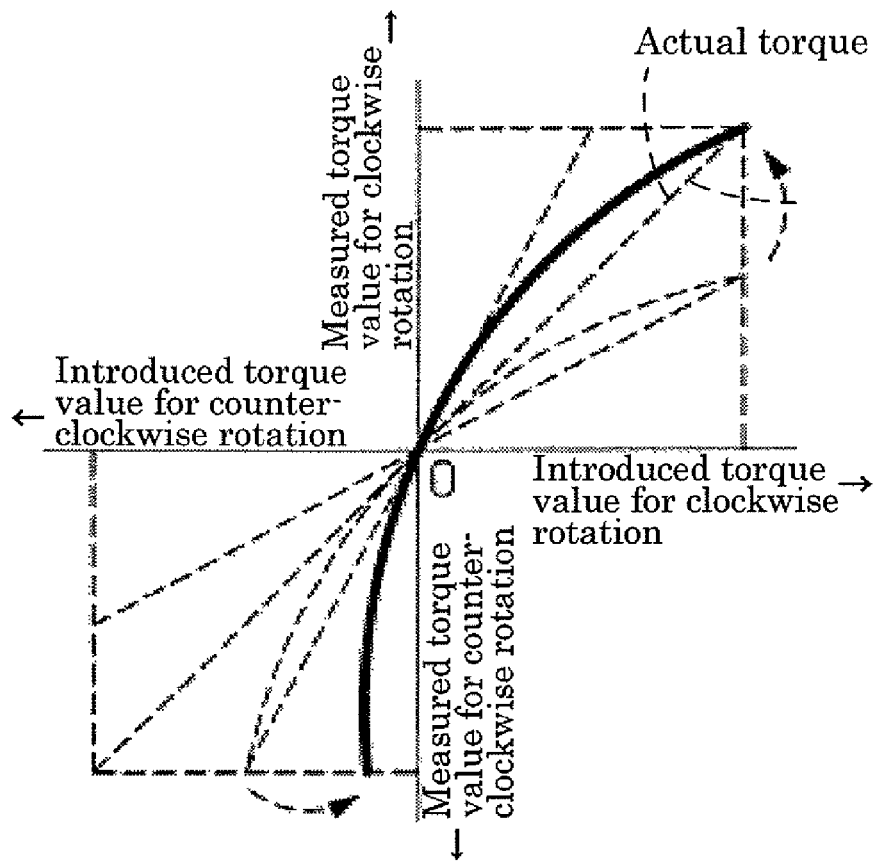
FIG. 6 is a schematic diagram showing the relationship between introduced torque values and measured torque values obtained in the case where a constant gain is applied irrespective of whether the tightening direction is clockwise or counterclockwise.

FIG. 3 shows an example of the application of different gains depending on whether the tightening direction is clockwise or counterclockwise. The comparison between FIG. 3 and FIG. 6, which illustrates a conventional example, shows that amplification performed with different gains depending on whether the tightening direction is clockwise or counterclockwise allows errors between introduced torque values and measured torque values to be reduced irrespective of the tightening direction.

Figure 4:
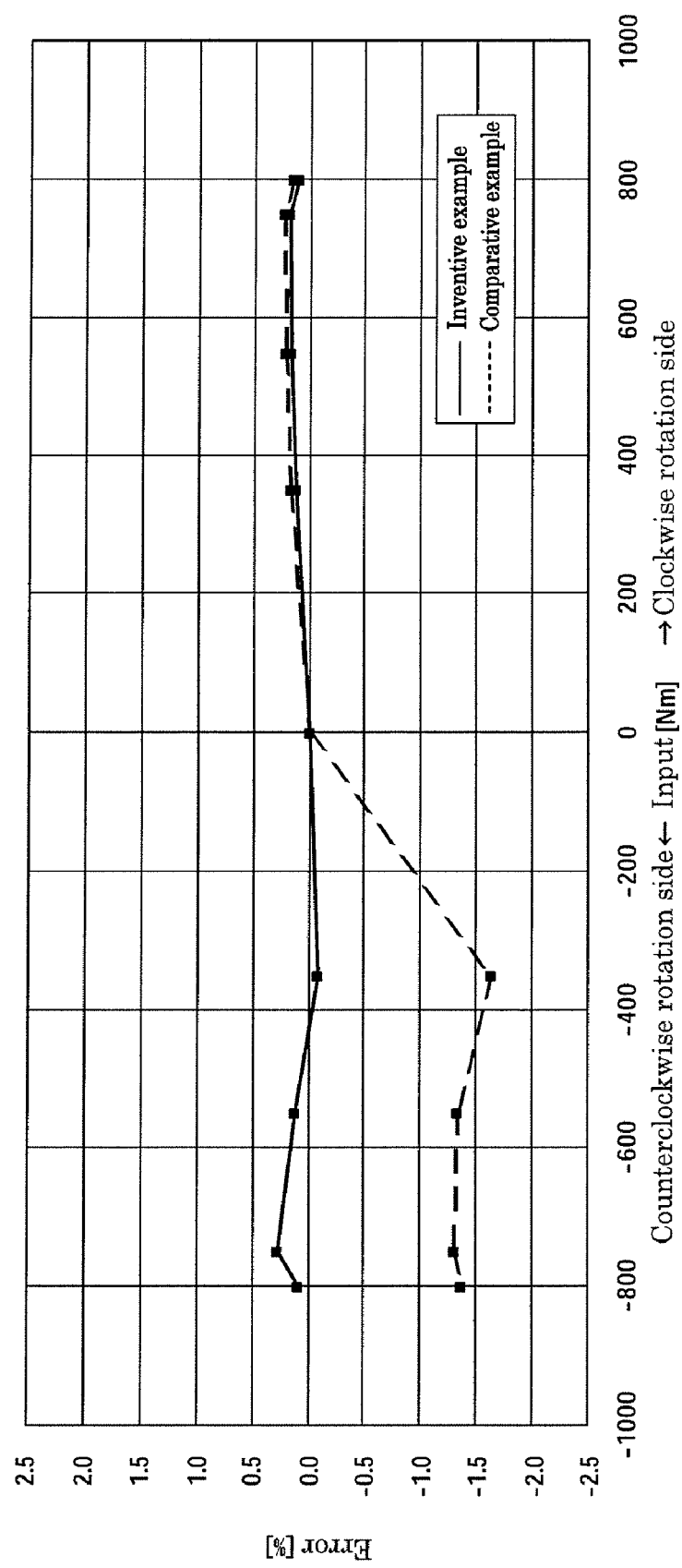
FIG. 4 is a graph showing a comparison between an inventive example, in which torque measurement is performed with individually different gains applied depending on whether the tightening direction is clockwise or counterclockwise, and a comparative example, in which torque measurement is performed with a constant gain irrespective of whether the tightening direction is clockwise or counterclockwise, the comparison being made in terms of an error between introduced torque values and measured torque values.
Figure 5:
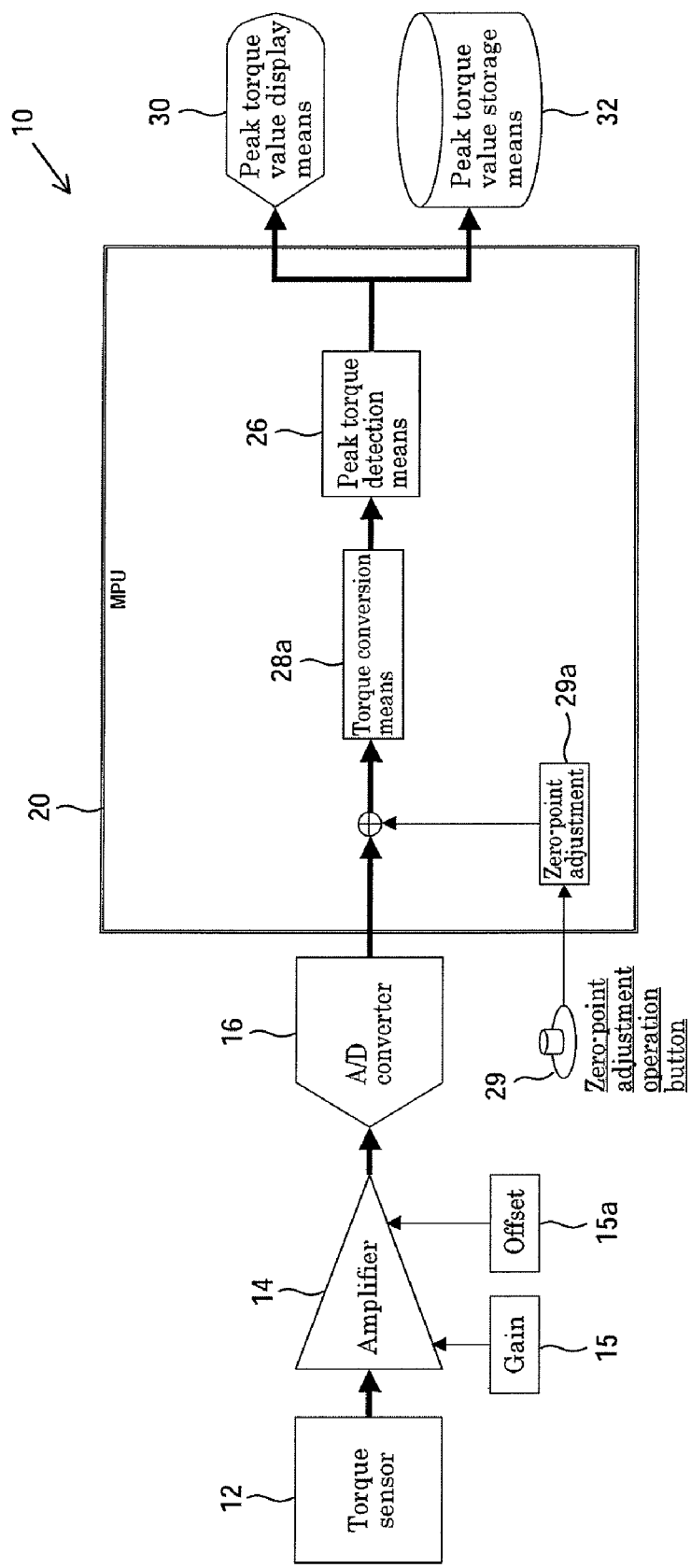
FIG. 5 is a block diagram of a conventional tightening torque measuring unit.

FIG. 4 is a graph showing a comparison between measured torque values obtained by the tightening torque measuring unit 10 of the present invention in the case where amplification is performed with different gains depending on whether the tightening direction is clockwise or counterclockwise, and measured torque values of a comparative example in which amplification is performed with a constant gain irrespective of whether the tightening direction is clockwise or counterclockwise and the gain is so set as to reduce errors with respect to the clockwise tightening direction. Here, the comparison is made in terms of errors between those measured torque values and introduced torque values.

The tightening is performed so that the applied torque values are in the range of −800 Nm (on the counterclockwise side) to +800 Nm (on the clockwise side).

Referring to FIG. 4, it can be seen that the tightening torque measuring unit 10 of the present invention enables errors in the measured torque values to be generally reduced to within ±0.3% in either the clockwise or counterclockwise tightening direction. On the other hand, in the comparative example where the same value was used as both the clockwise and the counterclockwise gains, although measurement errors with respect to the clockwise torque were not so different from those of the present invention, errors in the measured torque values with respect to the counterclockwise torque exceeded 1.0%, which indicates that high-precision torque measurement cannot be implemented.

The present invention is useful as a tightening torque measuring unit capable of performing high-precision torque measurement irrespective of the tightening direction of a tightening apparatus.

The invention claimed is:

1. A tightening torque measuring unit installed in a tightening apparatus, comprising:
   a torque sensor that detects a tightening torque;
   an amplifier that amplifies an output from the torque sensor; and
   a clockwise or counterclockwise selection means for determining whether a tightening direction of the tightening apparatus is clockwise or counterclockwise,
   wherein the amplifier applies a different gain to the output from the torque sensor depending on the tightening direction of the tightening apparatus determined by the clockwise or counterclockwise selection means.

2. The tightening torque measuring unit according to claim 1, wherein the amplifier includes a clockwise amplifier having a gain that is applied to a clockwise tightening torque, and a counterclockwise amplifier having a gain that is applied to a counterclockwise tightening torque.

3. The tightening torque measuring unit according to claim 2, further comprising a switching mechanism, wherein the switching mechanism is connected to the clockwise amplifier and the counterclockwise amplifier, the switching mechanism performing the switching operation between the clockwise amplifier and the counterclockwise amplifier, depending on the tightening direction of the tightening device.

4. The tightening torque measuring unit according to claim 3, wherein the switching mechanism determines the tightening direction of the tightening apparatus, based on an output from the torque sensor input into either the clockwise amplifier or the counterclockwise amplifier.

5. The tightening torque measuring unit according to claim 1 that is removably installed in a tightening apparatus.

* * * * *